United States Patent

[11] 3,580,530

| [72] | Inventors | Misao Wada<br>Fujisawa-shi;<br>Kiyoshi Soda, Yokohama-shi, Japan |
|---|---|---|
| [21] | Appl. No. | 802,192 |
| [22] | Filed | Feb. 25, 1969 |
| [45] | Patented | May 25, 1971 |
| [73] | Assignee | Japan Aircraft Manufacturing Co., Ltd.<br>Yokohama-shi, Japan |
| [32] | Priority | Nov. 9, 1968 |
| [33] |  | Japan |
| [31] |  | 43/81622 |

[54] LIFT FAN INSTALLATION OF VERTICAL OR SHORT TAKE-OFF AND LANDING AIRCRAFT
3 Claims, 13 Drawing Figs.

[52] U.S. Cl. ............................................. 244/54,
60/264, 244/12
[51] Int. Cl. ....................................... B64c 29/04,
F02k 3/04
[50] Field of Search ................................. 60/226,
262, 264; 244/12, 12 (A,B), 52, 53, 54

[56] References Cited
UNITED STATES PATENTS

| 3,033,493 | 5/1962 | Wilde | 244/52 |
| 3,069,848 | 12/1962 | Griffith | 244/53 |
| 3,223,354 | 12/1965 | Seibold | 244/52 |

FOREIGN PATENTS

| 788,290 | 12/1957 | Great Britain | 244/12 |
| 967,780 | 8/1964 | Great Britain | 244/12 |
| 1,009,269 | 11/1965 | Great Britain | 244/12 |

*Primary Examiner*—Douglas Hart
*Attorney*—Flynn and Frishauf

ABSTRACT: A lift fan installation of vertical or short takeoff and landing aircraft has a single or plurality of lift fan assemblies, and a casing or casings for housing said lift fan assembly. Said lift fan assembly involves a gas generator, a fan driven by the fluid derived from said generator, and an engine body in which said generator and fan are disposed. Between the inner wall of the casing and the outer wall of the engine body is defined an air passage, the effective cross-sectional area of which is less than one and a half times that of the exhaust duct of said lift fan assembly.

MISAO WADA &
KIYOSHI SODA,
INVENTORS

BY Flynn & Frishauf

LIFT FAN INSTALLATION OF VERTICAL OR SHORT TAKE-OFF AND LANDING AIRCRAFT

This invention is concerned with improvements in a lift fan installation of vertical or short takeoff and landing aircraft so as to increase the thrust per lift fan assembly.

It has been an important problem in the aircraft industry to increase an effective thrust generated by a lift fan assembly without increasing its weight and bulk. Developments heretofore made have generally been directed to improvement in the efficiency of the lift engine.

In contrast, the present invention consists in utilizing the dead space between the inner wall of a casing and the outer wall of the engine body of a lift fan assembly.

This was found during an attempt to utilize the principle underlying the prior art by applying a more advanced theory related thereto.

Said principle was detailed in Theodore Von Karman's report entitled "Theoretical Remarks on Thrust Augmentation." His report states that if a fluid flowing through a cylindrical tube provided with a jet nozzle is considered to be incompressible, the thrust augmentation of the fluid may be determined from the following equations:

$$Au_1 + = (A+)u_2 \quad (1)$$

$$(A-a)(u_1^2/2) + aU^2 = (A+a)u_2 \quad (2)$$

where $a$ denotes the cross-sectional area of the jet nozzle, $A$ the balance of the cross-sectional area of the cylindrical tube from which has been subtracted said area $a$, $U$ the velocity of the fluid jetted through the jet nozzle, $u_1$ the velocity of the fluid flowing between the walls of the cylindrical tube and jet nozzle, and $u_2$ the fluid velocity in the cylindrical tube downstream of the outlet of the jet nozzle.

From the equations (1) and (2) above, may be derived the following:

$$\varphi = \frac{1+\nu}{\nu} \cdot \left(\frac{u_2}{U}\right)^2 \quad (3)$$

where $\Phi$ represents the thrust augmentation ratio and $\nu$ denotes a value represented by a fraction $a$ over $A$. In this case, if $\nu$ is larger than 1, $\Phi$ will assume a value below unity.

This appears to be theoretically unreasonable, and indicates the impossibility of utilizing the dead space between the inner wall of the casing and the outer wall of the engine body of the lift fan assembly so as to improve the substantial efficiency of the lift engine, because the cross-sectional area of said dead space is defined as small as possible in general design, for example, said area having a smaller value than that of the jet nozzle or one and a half times the latter area.

These inventors have found that Karman's principle disregards the reduction of static pressure at the outlet of the jet nozzle, with the resultant augmentation of jet velocity.

They have corrected the equation (3) by including a new factor in the augmentation of jet velocity as follows:

$$(\varphi \text{ as corrected}) = \frac{1+\nu}{\nu} \cdot \left(\frac{u_2}{U}\right)^2 \bigg/ \left(1 - \frac{u_1^2}{U^2}\right) \quad (4)$$

$$\therefore \frac{u_1}{U} = (1-\nu) \cdot \frac{u_2}{U} - \nu \quad (5)$$

An object of this invention is to provide a lift fan installation of vertical or short takeoff and landing aircraft so improved as to be put to practical use due to the theoretical proof of the equations corrected by these inventors.

In an aspect of this invention, a lift fan installation of vertical or short takeoff and landing aircraft involves a single or plurality of lift fan assemblies, and a casing or casings for housing said lift fan assembly, said lift fan assembly having a gas generator, a fan driven by the fluid derived from said generator, and an engine body in which said gas generator and fan are disposed, and is characterized by an air passage defined between the inner wall of the casing and the outer wall of the engine body, the effective cross-sectional area of said passage being less than one and a half times that of the exhaust duct of said fan assembly.

Said air passage can be made by utilizing the dead space without increasing the weight and bulk of the lift fan installation.

The invention in now described in conjunction with preferred embodiments with reference to the accompanying drawings, in which.

Figure 1:
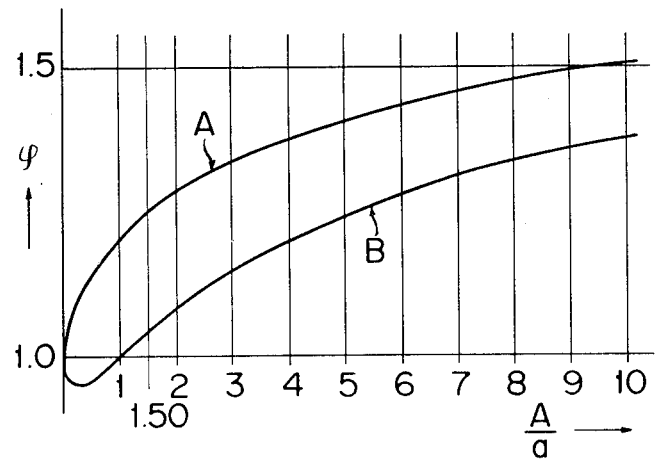
FIG. 1 is a diagram of the thrust augmentations obtained from these inventor's equations and Karman's equations.

A lift fan installation of vertical or short takeoff and landing aircraft (hereinafter called "V/STOL aircraft") embodying this invention has been made available for practical use by the discovery that the dead space of the installation can be fully utilized by applying the equations corrected by these inventors. The thrust augmentation $\Phi$ which has been made possible by the varied area ratio $A/a$ derived from the inventor's equations is indicated by line A in FIG. 1, while that based on Karman's equations is indicated by line B in the same figure. Said lift fan installation of the V/STOL aircraft can be designed without increasing its weight and bulk substantially within the range of the area ratio $A/a \lesssim 1.5$.

Said lift fan installation is constituted by a plurality of lift fan assemblies such as turbojets 1 and a lift fan pod 2 with a casing 3 for containing said lift fan assemblies. Said lift fan assembly involves a gas generator, a turbofan driven by the generator and a circular engine body 4 surrounding said generator and fan. Between the inner wall of the casing 3 and the outer wall of the engine body 4 is formed an air passage 5 which is the key part of this invention. Bracket members (not shown) for causing the lift fan assemblies 1 to be supported by the casing 3 are fabricated preferably in such a manner that the air is passed through the passage 5 without being deflected.

Figure 2:
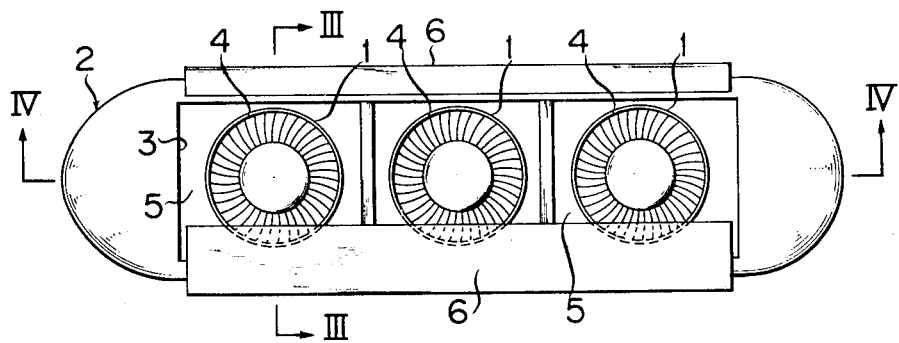
FIG. 2 is a plan view of a lift fan installation embodying this invention.
Figure 3:
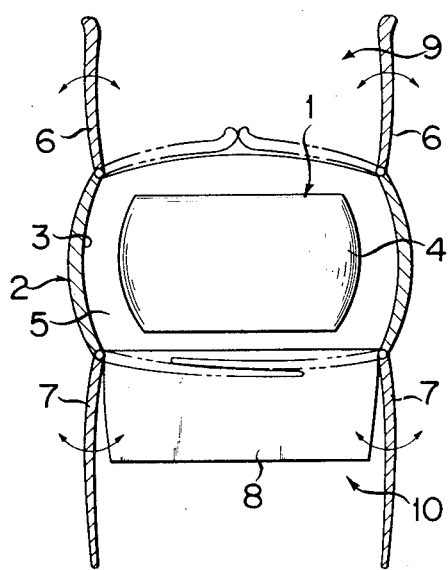
FIG. 3 is a vertical cross-sectional view of said lift fan installation taken along a line III—III of FIG. 2.
Figure 4:
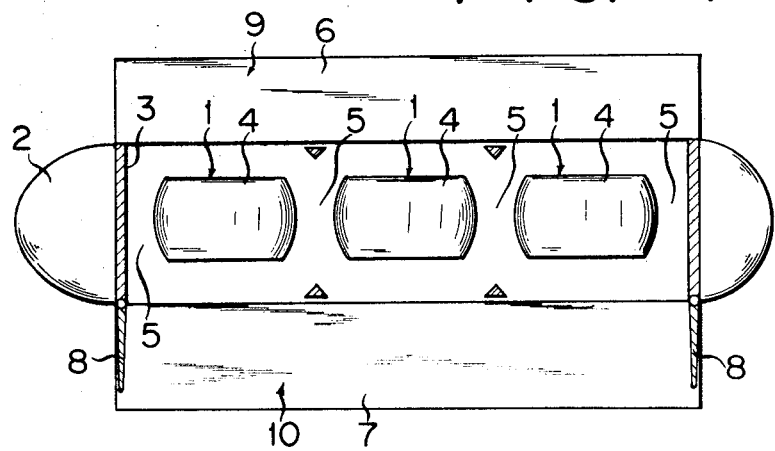
FIG. 4 is a vertical cross-sectional side view of said lift fan installation taken along a line IV–IV of FIG. 2.

In the embodiment of FIG. 3, the lift fan pod 2 has a pair of intake doors 6 disposed on both upper sides thereof, a pair of exhaust doors 7 disposed on both lower sides thereof and front and rear doors 8 positioned at the front and rear portions of the exhaust of the air passage 5. These doors 6 to 8 are hinged on the outer wall of the pod 1 in a manner to surround the air passage 5, thereby to form additional air passages 9 and 10 communicating with the air passage 5 when opened. Said additional passages 9 and 10 are effective to maintain the clear fluid stream so that the thrust of the fluid through the casing and lift fan assembly is effectively utilized. In order to form the passage 10 as long as possible, said exhaust doors 7 are so arranged as to be superposed on each other when closed. The operation of these doors is remote controlled by suitable means, for example, hydraulic control means (not shown). The aforesaid arrangement is detailed in the embodiment of FIGS. 2 to 4.

Figure 5:
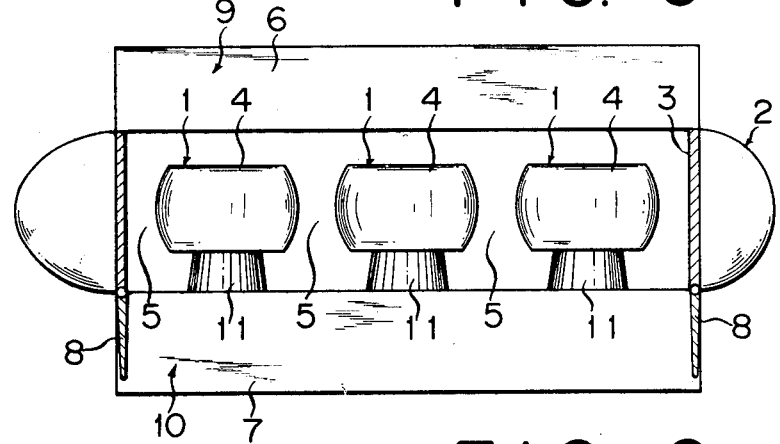
FIG. 5 is a vertical cross-sectional view of a lift fan installation modified from that of FIGS. 2 to 4.

Another embodiment of this invention is indicated in FIG. 5. The lift fan installation of said embodiment specifically involves an annular member 11 for causing the exhaust gas from the lift fan assembly to be mixed with the air through the air passage.

Figure 6:
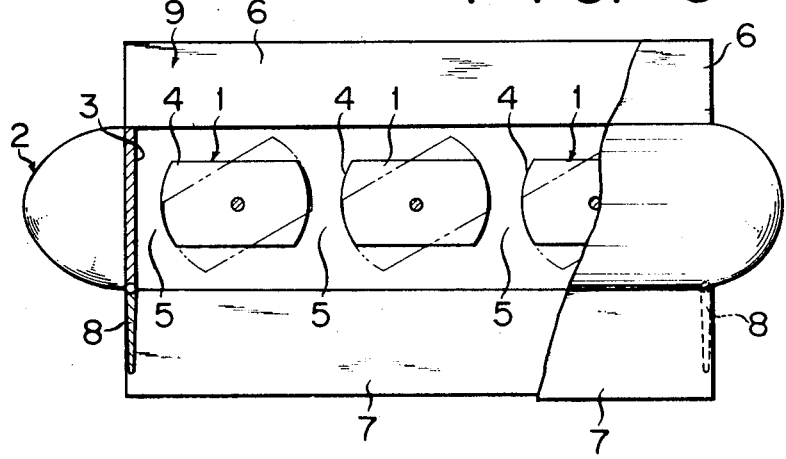
FIG. 6 is a vertical side view of a lift fan installation, partly broken, further embodying this invention.

A further embodiment of this invention is indicated in FIG. 6, wherein each of the lift fan assemblies can be rotated in a vertical plane extending from the front portion to the rear portion of the installation.

According to this invention, the effective cross-sectional area of the air passage 5 is set at a value less than one and a half times that of the exhaust duct of the lift fan assembly thereby to utilize the dead space between the inner wall of the casing 3 and the outer wall of the engine body 4 which has been unavoidably left unused in the conventional design of said lift fan installation.

Figure 7:
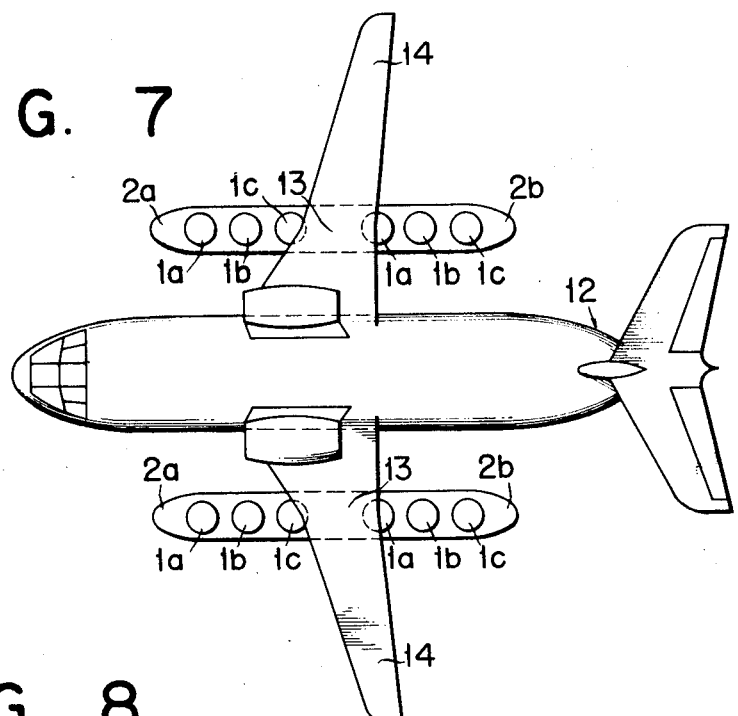
FIG. 7 is a plan view of an airplane equipped with lift fan installations of this invention.
Figure 8:
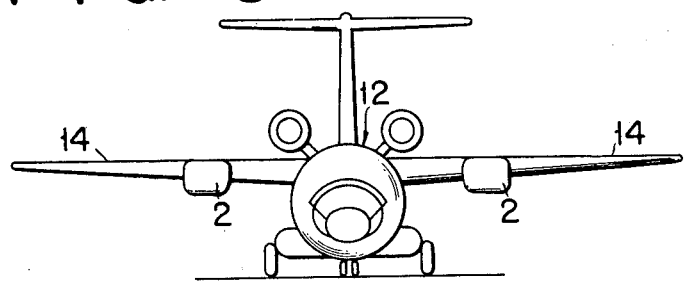
FIG. 8 is a front view of said airplane of FIG. 7.
Figure 9:
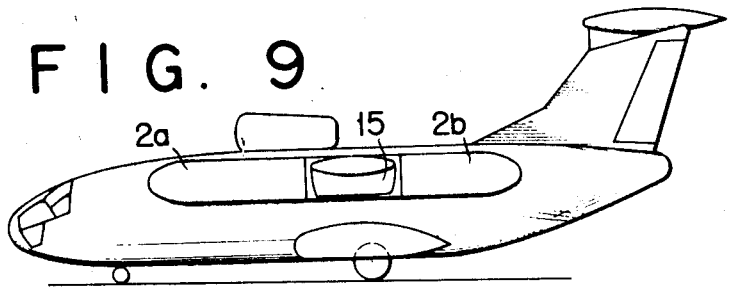
FIG. 9 is a side view of an airplane of FIG. 7.

An airplane 12 indicated in FIGS. 7 to 9 is equipped with lift fan installations of this invention which are positioned at the intermediate portions 13 of the wings 14 thereof. Therefore, each of said installations has two pods 2a and 2b jointly connected to each other via a structure 15 provided for connecting the installation with the wing. In each pod are disposed a plurality of, for instance, three lift fan assemblies 1a, 1b and 1c.

Figure 10:
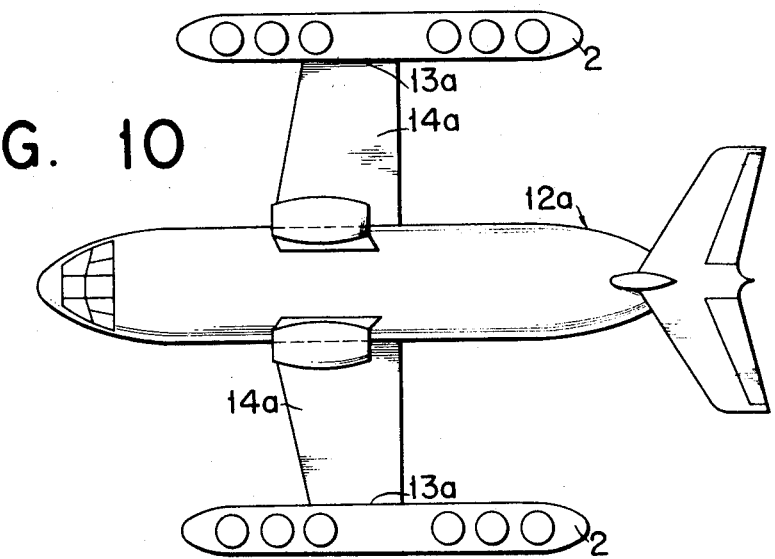
FIG. 10 is a plan view of an airplane equipped with lift fan installations at different positions from those of FIGS. 7 to 9.

An airplane 12a indicated in FIG. 10 is characterized by having the lift fan installations of this invention positioned at the free ends 13a of the wings 14a thereof.

Figure 11:
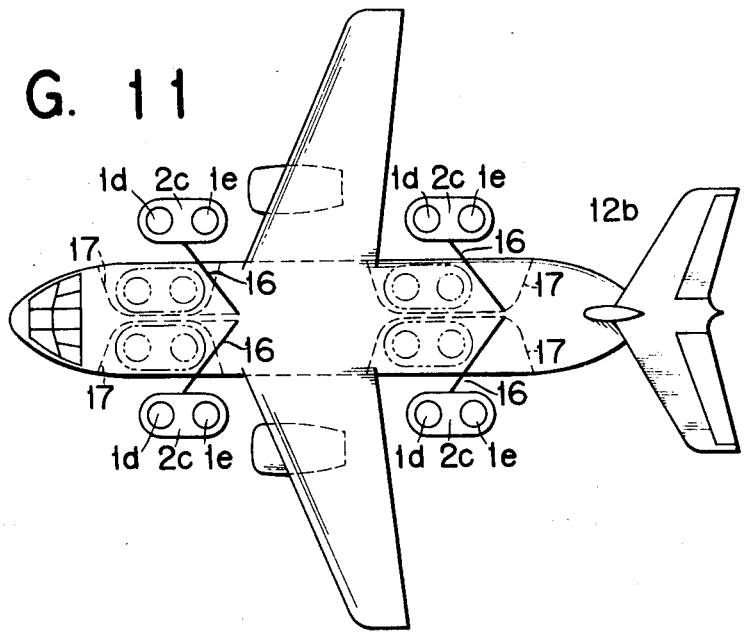
FIG. 11 is a plan view of said installations disposed at a further different position from those of the two above-mentioned airplanes.

An airplane 12b indicated in FIG. 11 is characterized by having the lift fan installations of this invention, each of which comprises a lift fan pod 2c and two lift fan assemblies 1d and 1e and which are capable of being housed in the body of said airplane. Namely, each of the lift fan pods is supported by a bar member 16 which is rotatably secured to the body. Said lift fan pods are respectively put in or out of housings 17 formed in the side portions of the body by the operation of the bar member.

Figure 12:
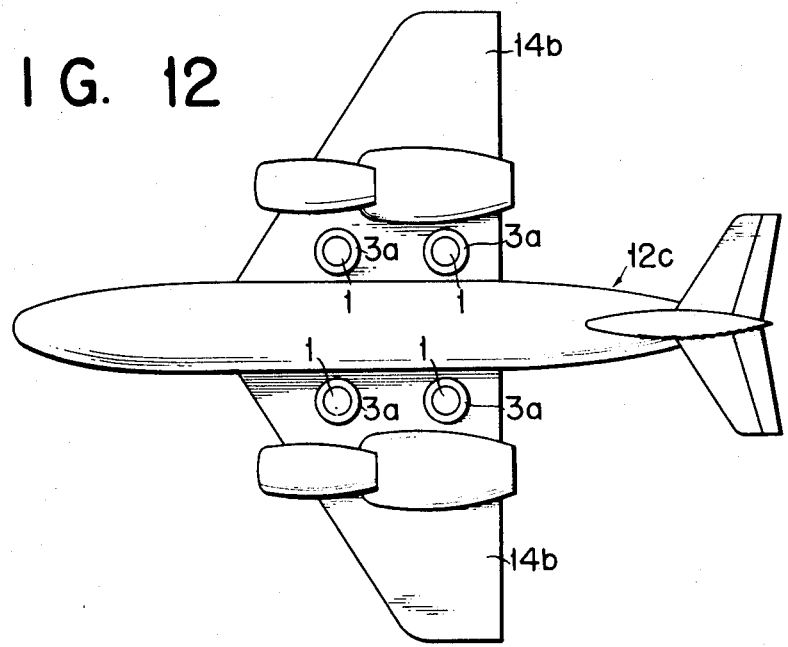
FIG. 12 is a plan view of said installations located at still further different parts of an airplane.
Figure 13:
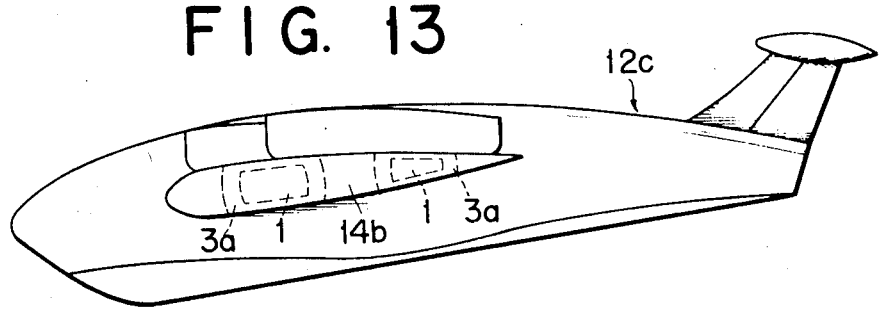
FIG. 13 is a side view of said airplane of FIG. 12.

An airplane 12c indicated in FIGS. 12 and 13 is characterized by having the lift fan installations of this invention, wherein casings 3a are housed in wings 14b and respectively contain a lift fan assembly.

Of course, the position of the lift fan installation may be selected as required in design.

We claim:

1. In a lift fan installation of vertical or short takeoff and landing aircraft comprising at least one lift fan assembly and at least one casing for housing said at least one lift fan assembly, each lift fan assembly including a gas generator, a fan driven by fluid derived from said generator, an exhaust duct and an engine body in which said generator and fan are disposed, the improvement comprising an air passage provided between the inner surface of said casing and the outer surface of said engine body, and a plurality of doors hinged on the upper periphery of said casing to form an extension of the incoming flow path through said casing when said doors are opened.

2. A lift fan installation as claimed in claim 1, further comprising a plurality of exhaust doors hinged on the lower periphery of said casing to form an extension of the exhaust flow path through the casing when said exhaust doors are opened, said exhaust doors being superposed on each other when closed.

3. A lift fan installation as claimed in claim 1, wherein the effective cross-sectional area of said air passage is less than one and one-half times that of said exhaust duct of said lift fan assembly, and wherein said air passage continuously surrounds said engine body.